June 16, 1925.

A. H. SHOEMAKER

SKATE WHEEL

Filed April 25, 1922

1,542,103

INVENTOR
Alvin H Shoemaker
BY
Fred C. Matheny
ATTORNEY

Patented June 16, 1925.

1,542,103

UNITED STATES PATENT OFFICE.

ALVIN H. SHOEMAKER, OF SEATTLE, WASHINGTON.

SKATE WHEEL.

Application filed April 25, 1922. Serial No. 556,414.

*To all whom it may concern:*

Be it known that I, ALVIN H. SHOEMAKER, a citizen of the United States, and a resident of Seattle, in the county of King and State of Washington, have invented certain new and useful Improvements in Skate Wheels, of which the following is a specification.

My invention relates to improvements in wheels for roller skates, and the object of my improvement is to provide a skate wheel in which the tread portion is formed of a resilient or elastic material as rubber, that is capable of absorbing slight shocks and vibrations, that will not mark or mar the surface on which it runs and that will be practically noiseless in operation.

Another object is to provide a skate wheel of this nature, having a relatively long bearing, that is, provided with a wheel or tread portion at each end, each of said tread portions being formed of a rubber disc that is securely clamped between two side members whereby it is rigidly held against movement relative to the other parts of the wheel.

Other objects are to provide a skate wheel that is strong and substantial in construction, relatively light in weight, cheap to manufacture, and one that is possessed of excellent wearing qualities.

Other and more specific objects will be apparent from the following description taken in connection with the accompanying drawings.

Roller skate wheels are ordinarily made of metal, which possesses slight resilience and elasticity, and which is productive of much noise when the skates are used on floors, pavements, sidewalks and like surfaces. I am aware that previous attempts have been made to produce successful skate wheels having treads formed of other and more resilient material. Wheels having tread surfaces formed of rubber overcome these objectionable features, but on account of the small diameters of the wheels, it is difficult to provide treads in the form of tires that will stay on the wheels and that can be effectively anchored against creeping. I have found that by making the wheels of duplex construction with a relatively long axial bearing, and with a rubber disc at each end, the said rubber discs each being securely clamped between members of smaller diameter than the discs, it is possible to produce a thoroughly practical and successful skate wheel having a rubber tread portion that is sufficiently substantial to withstand all ordinary usage and that is permanently anchored to the axle portions of the wheel in such a manner as to prevent it from creeping on the wheel or being stripped off of the wheel.

Figure 1:
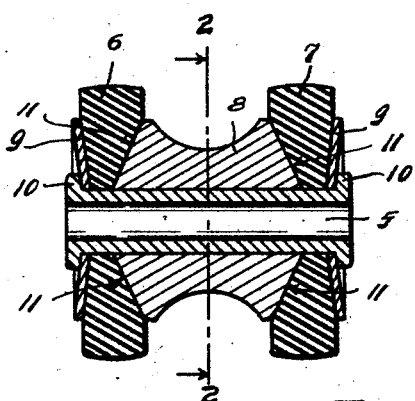
Figure 2:
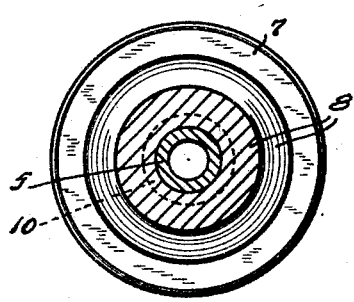

In the drawings, Figure 1, is a view in longitudinal mid-section of a skate wheel constructed in accordance with my invention, and Figure 2, is a view in cross section of the same, substantially on broken line 2—2 of Figure 1.

Like reference numerals designate like parts throughout the several views.

Referring to the drawings, I have shown a skate wheel comprising a relatively long bearing tube or hub member 5, upon the ends of which are mounted two discs 6 and 7 of elastic material as rubber or rubber composition, that are separated from each other by a spacing block 8, and that are securely clamped against the ends of the spacing block 8 by washers 9, the ends of the bearing tube being riveted or flanged outwardly as at 10 to prevent displacement of the washers 9 and to form end thrust bearings for the wheels.

The ends of the spacing blocks 8 are of conical shape, as indicated at 11, and the washers 9 may be dished slightly as shown so that when the wheel is assembled, the rubber discs 6 and 7 will be under greater compression near the axle tube 5, than near the periphery of the block 8 and washers 9, the compression preferably gradually decreasing from the center outwardly. The discs 6 and 7 are sufficiently larger in diameter than the spacing block 8 and washers 9 to provide a substantial tread portion that will withstand a great amount of use before it will become worn down to the same diameter as said spacing block and washers.

In constructing the discs 6 and 7 the inner surfaces may be recessed to partially or entirely conform to the shape of the ends 11 of the spacing block 8.

In assembling this wheel the discs 6 and 7 are firmly and securely clamped between the ends of the spacing block 8 and the washers 9, so that the central portions of such discs are maintained in a state of compression, the compression preferably being greatest toward the center and decreasing toward the periphery, but such compression being great enough at all points to prevent any movement of the discs 6 and 7 between the ends of the block 8 and the washers 9.

The spacing block 8 is movable, lengthwise of the bearing tube 5, thereby equalizing the compression of the two discs 6 and 7.

The discs 6 and 7 are preferably made of a rubber composition that is sufficiently solid to produce a substantial and easy running wheel and at the same time is sufficiently elastic so that it will not be affected by small obstructions as sand or small pebbles that may be encountered in use.

These skates are especially well adapted for the use of children in skating on sidewalks, pavements and like places where the surfaces are not always level and are often covered with sand, grit and small pebbles, that offer serious obstruction to metal wheels. Another great advantage of these skates for children's use is that they are practically noiseless in operation and will not mark or mar ordinary floors, thereby enabling children to use them in dwelling houses without damaging the floors or annoying the occupants.

The wheels are relatively cheap in construction, are substantial and durable, are relatively light in weight as compared with the usual metal wheel structure, are practically noiseless in operation and eliminate much of the jolt and jar common to metal wheels. The long bearing tube 5 affords a bearing from which dirt and sand is easily excluded.

Only two of these wheels are needed on each skate, each wheel being in effect a double wheel with but a single bearing that extends entirely across the skate that is very strong and durable in construction, that makes the wheel run easily and smoothly and that eliminates the necessity of the four individual roller bearings for each of the four wheels of a skate as are ordinarily provided.

In operation these wheels have been found to be very satisfactory and to permit the skate to be turned and manipulated in substantially the same manner as the ordinary skate wheel does.

The foregoing description together with the accompanying drawings clearly disclose a preferred embodiment of my invention, but it will be understood that this disclosure is merely illustrated and that such changes in the device may be made as are within the scope and spirit of the invention.

What I claim is:

1. A skate wheel embodying a bearing member, two discs of elastic material disposed near the respective ends of said bearing member and forming treads, spacing means of less diameter than said discs interposed between said discs and means on the ends of said bearing member for compressing said discs against said spacing means.

2. A skate wheel embodying a relatively long bearing tube, two discs of elastic material disposed near the respective ends of said bearing tube, a spacing block of less diameter than said discs, slidable on said bearing tube and interposed between said discs, and washer members secured on the ends of said bearing tube for holding said discs firmly compressed against the ends of said spacing blocks.

3. A skate wheel embodying two spaced apart discs of resilient material, a spacing block interposed between said two discs, said spacing block being of less diameter than said discs, and having convex ends engaging said discs, a bearing tube extending through said spacing block and said discs and washers on the ends of said bearing tube engaging the outer sides of said discs, the discs being securely compressed between the ends of the spacing block and the washers and the ends of the bearing tube being flanged outwardly, to retain the washers thereon.

4. A duplex wheel for a roller skate, embodying two spaced apart rubber discs, a spacing member interposed between said discs and having conical ends that engage said discs, an axial bearing tube extending through said spacing member and said discs and washers secured on the ends of said bearing tube, said washers having convex inner sides that engage with the outer sides of said discs, the discs being highly compressed between the ends of the spacing member and the washers.

ALVIN H. SHOEMAKER.